(12) United States Patent
Okano et al.

(10) Patent No.: US 11,190,499 B2
(45) Date of Patent: Nov. 30, 2021

(54) COMMUNICATION TERMINALS, SERVER DEVICES, AND PROGRAMS

(71) Applicant: NIPPON TELEGRAPH AND TELEPHONE CORPORATION, Chiyoda-ku (JP)

(72) Inventors: Yuki Okano, Musashino (JP); Reo Yoshida, Musashino (JP); Ryo Nishimaki, Musashino (JP); Tetsutaro Kobayashi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 441 days.

(21) Appl. No.: 16/315,321

(22) PCT Filed: Jul. 6, 2017

(86) PCT No.: PCT/JP2017/024752
§ 371 (c)(1),
(2) Date: Jan. 4, 2019

(87) PCT Pub. No.: WO2018/016330
PCT Pub. Date: Jan. 25, 2018

(65) Prior Publication Data
US 2019/0238523 A1    Aug. 1, 2019

(30) Foreign Application Priority Data

Jul. 19, 2016   (JP) .............................. JP2016-141707

(51) Int. Cl.
*H04L 29/06*    (2006.01)
*H04L 9/16*    (2006.01)
(Continued)

(52) U.S. Cl.
CPC .......... *H04L 63/061* (2013.01); *H04L 9/0618* (2013.01); *H04L 9/08* (2013.01);
(Continued)

(58) Field of Classification Search
CPC ....... H04L 63/061; H04L 9/08; H04L 9/0618; H04L 9/3013; H04L 9/302; H04L 9/16; H04L 9/0891; H04L 9/0825; H04L 9/0822
See application file for complete search history.

(56) References Cited

U.S. PATENT DOCUMENTS 8,769,260 B1    7/2014 Kwan et al.
2002/0146127 A1*    10/2002 Wong ...................... H04L 9/321
380/270
(Continued)

OTHER PUBLICATIONS

The partial Supplementary European Search Report dated Feb. 12, 2020 in Patent Application 17830850.8, 12 pages.
(Continued)

*Primary Examiner* — Nelson S. Giddins
(74) *Attorney, Agent, or Firm* — Oblon, McClelland, Maier & Neustadt, L.L.P.

(57) ABSTRACT

A communication terminal shares a session key with and sends cipher text to another communication terminal via a server device, including: a common key cipher text obtaining unit that encrypts a message based on a common key to obtain common key cipher text; a function computation result obtaining unit that computes the common key and the session key based on a predetermined first function to obtain a function computation result; a public key cipher text obtaining unit that encrypts the function computation result based on a public key to obtain public key cipher text; and a cipher text sending unit that sends the common key cipher text and the public key cipher text to the server device. The communication terminal can update data previously saved in (Continued)

a server to data that can be decrypted on the communication terminal side using an updated session key, without the server decrypting the data.

12 Claims, 16 Drawing Sheets

(51) Int. Cl.
  *H04L 9/08* (2006.01)
  *H04L 9/06* (2006.01)
  *H04L 9/30* (2006.01)

(52) U.S. Cl.
  CPC ............... *H04L 9/16* (2013.01); *H04L 9/302* (2013.01); *H04L 9/3013* (2013.01)

(56) References Cited

U.S. PATENT DOCUMENTS

| | | | |
|---|---|---|---|
| 2003/0046539 A1 | 3/2003 | Negawa | |
| 2005/0232426 A1 | 10/2005 | Konersmann et al. | |
| 2007/0094503 A1 | 4/2007 | Ramakrishna | |
| 2010/0046757 A1 | 2/2010 | Dancer et al. | |
| 2011/0296192 A1* | 12/2011 | Hayashi | G06F 21/53 713/180 |
| 2015/0270964 A1* | 9/2015 | Yasuda | H04L 9/0825 713/171 |
| 2016/0119292 A1* | 4/2016 | Kaseda | H04L 9/14 713/165 |
| 2017/0034138 A1* | 2/2017 | Vaudenay, Jr. | H04L 63/0435 |

OTHER PUBLICATIONS

International Search Report dated Sep. 26, 2017, in PCT/JP2017/024752, filed Jul. 6, 2017.

NTT Software, "TopicRoom: group chat for business", https://www.ntts.co.jp/producis/topicroom/index.html, searched for on Jul. 6, 2016, 5 pages (with partial English translation).

Kobayashi, T. et al., "Scalable and Dynamic Multi-Cast Key Distribution", Proceedings of SCIS2016 Symposium on Cryptography and Information Security, the Institute of Electronics, Information and Communication Engineers, Jan. 2016, pp. 1-7.

* cited by examiner

COMMUNICATION TERMINALS, SERVER DEVICES, AND PROGRAMS

TECHNICAL FIELD

The present invention relates to communication terminals, server devices, and programs.

BACKGROUND ART

Some message transmission systems intended for business use include systems which are capable of supporting multi-devices such as personal computers and smartphones. Such multi-device supporting systems include cloud-based message transmission systems, which leave no data in communication terminals in consideration of possible leakage of companies' confidential information. An example of cloud-based message transmission systems is described in Non-patent Literature 1.

In such a message transmission system, communication channels are encrypted for prevention of eavesdropping on the communication channels or, as already mentioned, no data is left in communication terminals for prevention of information leakage arising from loss or unauthorized taking out of a communication terminal. While the conventional message transmission systems thus address threats on "communication channels" and "communication terminals", their measures against threats on server devices are not sufficient.

A threat on a server device as referred to herein can be an "external attack on the server device" or an "internal fraud by a server administrator or the like". A possible countermeasure against these threats is to save messages in encrypted form. However, as long as the messages can be decrypted on the server device side, there is still a possibility of message leakage from the server device in case of such a threat. What is important is that messages sent to a server device which is responsible for transmission/reception and saving of messages are concealed from the server device (are not intercepted on the server device side).

One possible approach is to realize end-to-end encrypted communication in which messages are concealed from the server device and can be decrypted only at communication terminals. In this case, how to share a common key used among communication terminals is an issue. A solution to this issue is disclosed in Non-patent Literature 2, for example. Non-patent Literature 2 proposes a protocol for sharing a key (hereinafter, a session key) among users in a star network having an authentication server at the center without leaking any information to the authentication server.

This enables exchange of messages between communication terminals while keeping the messages concealed against the server device. Also, since the session key is shared in such a manner to make messages readable only by the currently participating communication terminals, the session key is updated when there is an event such as addition or deletion of a user.

PRIOR ART LITERATURE

Non-Patent Literature

Non-patent Literature 1: NTT Software, "TopicRoom: group chat for business", [online], NTT Software, [searched on Jul. 6, 2016], the Internet <URL: https://www.ntts.co.jp/products/topicroom/index.html>
Non-patent Literature 2: Tetsutaro Kobayashi, Kazuki Yoneyama, Reo Yoshida, Yuto Kawahara, Hitoshi Fuji, and Tomohide Yamamoto, "Scalable and Dynamic Multi-Cast Key Distribution", Proceedings of SCIS2016 Symposium on Cryptography and Information Security, the Institute of Electronics, Information and Communication Engineers, January, 2016, 4E2-3

SUMMARY OF THE INVENTION

Problems to be Solved by the Invention

The technique of Non-patent Literature 2 allows a message to be exchanged while keeping it concealed from the server device by sharing of a key among communication terminals so as not to reveal it to the server device. However, since, in this technique of Non-patent Literature 2, the session key is shared only among the currently participating members, the session key could be updated upon addition or deletion of a user, such as at a login or logout event, or otherwise regularly updated. Thus, in order to allow only the currently participating communication terminals to read messages that were accumulated in the past, data that were previously saved in the server device must be updated to data that can be decrypted on the communication terminal side using an updated session key, without the data being decrypted on the server device side. Because of this issue, in practice, the aforementioned protocol is difficult to directly apply to a cloud-based message transmission system.

An object of the present invention is therefore to provide a communication terminal that can update data that was previously saved in a server device to data that can be decrypted on the communication terminal side using an updated session key, without the data being decrypted on the server device side.

Means to Solve the Problems

A communication terminal according to the present invention is a communication terminal that shares a session key with another communication terminal and sends cipher text to the other communication terminal via a server device. The communication terminal includes a common key cipher text obtaining unit, a function computation result obtaining unit, a public key cipher text obtaining unit, and a cipher text sending unit.

The common key cipher text obtaining unit encrypts a message based on a common key to obtain common key cipher text. The function computation result obtaining unit computes the common key and the session key based on a predetermined first function to obtain a function computation result. The public key cipher text obtaining unit encrypts the function computation result based on a public key to obtain public key cipher text. The cipher text sending unit sends the common key cipher text and the public key cipher text to the server device.

Effects of the Invention

The communication terminal of the present invention can update data that was previously saved in a server device to data that can be decrypted on the communication terminal side using an updated session key, without the data being decrypted on the server device side.

DETAILED DESCRIPTION OF THE EMBODIMENTS

Figure 1:
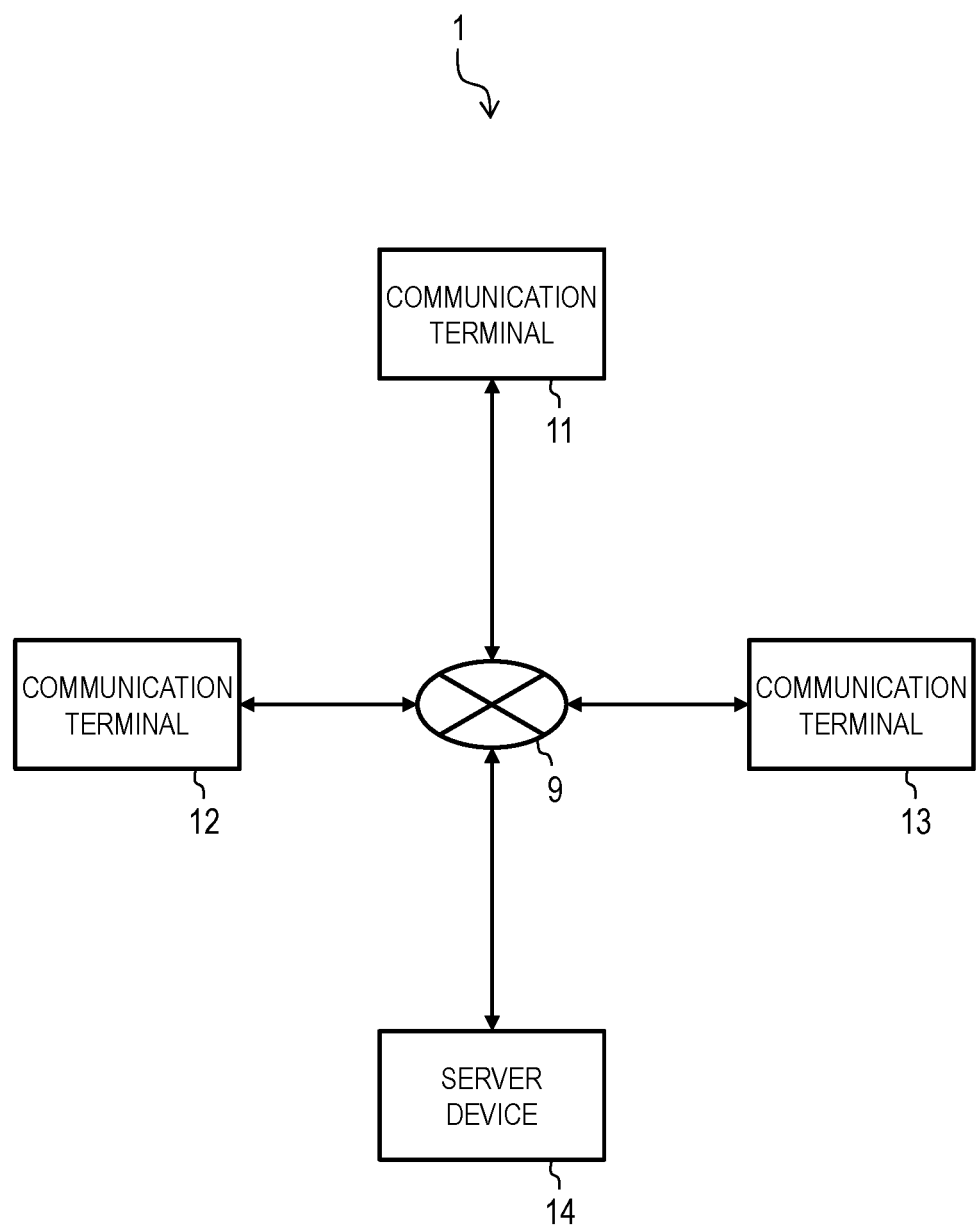
FIG. 1 is a block diagram showing a configuration of a communication system in a first embodiment.

Embodiments of the present invention will be now described in detail. Note that components having the same function are given the same reference character and repeated description is omitted.

For specific description of the embodiments of the present invention, setup (advance preparation) in a case of application to a cloud-based message transmission system is shown below. As a first embodiment will disclose an example of using a public key encryption scheme and a second embodiment will disclose an example without using a public key encryption scheme, the setup (advance preparation) is described for the respective cases.

<Setup: Common>

Let a set N be the set of all the positive integers. The symmetric key encryption scheme (DEM.Gen,DEM.Enc, DEM.Dec) to be described below is introduced. DEM.Gen is an algorithm that takes a k-bit (k∈N) string $1^k$ as input and outputs a key K of $k_1$-bit ($k_1$∈N) length. DEM.Enc is an algorithm that takes plaintext m and the key K as input and outputs cipher text $C_{DEM}$. DEM.Dec is an algorithm that takes the cipher text $C_{DEM}$ and the key K as input and outputs the plaintext m.

<Setup: When Public Key Encryption Scheme is Used>

Let a set N be the set of all the positive integers. The public key encryption scheme (KEM.Gen,KEM.Enc,KEM. Dec) to be described below is introduced. KEM.Gen is an algorithm that takes a k-bit (k∈N) string $1^k$ as input and outputs a pair (pk,sk) of a public key pk of $k_2$-bit ($k_2$∈N) length and a secret key sk of $k_3$-bit ($k_3$∈N) length. KEM.Enc is an algorithm that takes the public key pk and plaintext M of $k_1$-bit ($k_1$∈N) length as input and outputs cipher text $C_{KEM}$. KEM.Dec is an algorithm that takes the secret key sk and the cipher text $C_{KEM}$ as input and outputs the plaintext M. First, a key space of $k_1$-bit length is defined as $KEY_1 = \{0,1\}^{k1}$ and a key space of $k_2$-bit length is defined as $KEY_2 = \{0,1\}^{k2}$, and functions $f_{k1}$, $h_{k1}$, $g_{k1}$ satisfy the following conditions (1), (2), and (3), respectively. Here, condition (1) is not a precondition but a condition that is preferably satisfied.

(1) A family of functions, $\{f_{k1}:KEY_1 \times KEY_1 \rightarrow KEY_1\}_{k1 \in N}$, preferably satisfies the following condition. Specifically, for any positive integer $k_1$, the following proposition holds. There exist a certain probabilistic polynomial time algorithm A that takes an n-bit string $1^n$ and the output of the function $f_{k1}$ as input and outputs the elements of $KEY_1$, and a positive integer n' that satisfies the following for any c>0.

For any positive integer n greater than n', $$Pr\left[K' = K \,\bigg|\, (K, K_1) \overset{U}{\leftarrow} KEY_1 \times KEY_1, K' \overset{R}{\leftarrow} A(1^n, f_{k_1}(K, K_1))\right] < \frac{1}{n^c}$$

Pr[X|Y] represents a conditional probability of event X in event Y. The formula above is a mathematical expression indicating a level suitable as the security of the function $f_{k1}$. The formula above indicates that the possibility that K' satisfying K'=K can be determined is very low (Pr[ . . . ] <$1/n^c$) by computation of $f_{k1}(K,K_1)$ with whatever probabilistic polynomial time algorithm A. However, that the function $f_{k1}$ satisfies the security of the formula above is not a precondition and the function $f_{k1}$ is not limited to the formula above.

(2) For any $k_1 \in N$ and any $K,K_1 \in KEY_1$, a function $h_{k1}:KEY_1 \times KEY_1 \rightarrow *KEY_1$ that satisfies the following formula exists:

$$h_{k_1}(f_{k_1}(K,K_1),K_1)=K$$

(3) For an encryption function $KEM.Enc:KEY_2 \times KEY_1 \rightarrow KEY_1$ and a function $f_{k1}:KEY_1 \times KEY_1 \rightarrow KEY_1$, a function $g_{k1}:KEY_1 \times KEY_1 \rightarrow KEY_1$ exists and satisfies the following formula for any $K,K_1,K_2 \in KEY_1$:

$$Pr\left[M' = f_{k_1}(K, K_2) \,\bigg|\, \begin{array}{l} (pk, sk) \overset{R}{\leftarrow} KEM.Gen(1^k); \quad c_1 \overset{R}{\leftarrow} KEM.Enc(pk, f_{k_1}(K, K_1)); \\ c_2 \overset{R}{\leftarrow} KEM.Enc(pk, f_{k_1}(K_1, K_2)); \quad M' := KEM.Dec(sk, g_{k_1}(c_1, c_2)) \end{array}\right] = 1$$

The formula above is a mathematical expression defining the function $g_{k1}$. The formula above indicates that when a value determined by masking, with the function $g_{k1}$, cipher text $c_1$ (cipher text produced by encrypting, with the public key pk, a value representing the common key K and the session key $K_1$ as masked with the function $f_{k1}$) and cipher text $c_2$ (cipher text produced by encrypting, with the public key pk, a value representing the session key $K_1$ and an updated session key $K_2$ as masked with the function $f_{k1}$) is decrypted with the secret key sk, the result of decryption M' will always be $f_{k1}$ (K,$K_2$) (a value representing the common key K and the session key $K_2$ as masked with the function $f_{k1}$) (Pr[ . . . ]=1).

Such public key encryption can be an RSA encryption scheme, for example. That is, (KEM.Gen,KEM.Enc,KEM.Dec)=(RSA.Gen,RSA.Enc,RSA.Dec). Here, $(f_{k1},g_{k1},h_{k1})$ may be, for example, $(f_{k1},g_{k1},h_{k1})=(((x_1,x_2)\to x_1/x_2),((y_1,y_2)\to y_1\cdot y_2),((z_1,z_2)\to z_1\cdot z_2))$, which satisfy the conditions for $(f_{k1},g_{k1},h_{k1})$ described above. The computation "/" is represented as $x_1/x_2=x_1\cdot x_2^{-1}$, where "·" represents multiplication with a residue ring which is modulo the product n=pq of two prime numbers p, q that were generated during the setup for the RSA encryption scheme, and where $x_2^{-1}$ is the inverse element of $x_2$ in this computation.

The above-described public key encryption can also be an elliptic curve ElGamal encryption scheme, for example. That is, (KEM.Gen,KEM.Enc,KEM.Dec)=(ECEG.Gen,ECEG.Enc,ECEG.Dec). Here, $(f_{k1},g_{k1},h_{k1})$ may be, for example, $(f_{k1},g_{k1},h_{k1})=(((x_1,x_2)\to x_1-x_2),((y_1,y_2)\to y_1+y_2),((z_1,z_2)\to z_1+z_2))$, which satisfy the conditions for $(f_{k1},g_{k1},h_{k1})$ described above. The computation "−" is represented as $x_1-x_2=x_1+(-x_2)$, where $-x_2$ represents the inverse element of $x_2$ in an additive (+) group formed by points on an elliptic curve that was generated during the setup for the elliptic curve ElGamal encryption scheme.

Note that the public key encryption schemes that can be employed with the present invention are not limited to the above two (the RSA encryption scheme and the elliptic curve ElGamal encryption scheme).

<Setup: When Public Key Encryption Scheme is not Used>

A key space of $k_1$-bit length is defined as $KEY_1$ and a key space of $k_2$-bit ($k_2 \in N$) length is defined as $KEY_2$, and the functions $f_{k1}$, $h_{k1}$, $g_{k1}$ satisfy the foregoing conditions (1) and (2) and the condition (3a) shown below, respectively. Here, the foregoing condition (1) is not a precondition but a condition that is preferably satisfied.

(3a) For any $k_1 \in N$, a function $g_{k1}:KEY_1 \times KEY_1 \to KEY_1$ exists and satisfies $g_{k1}(f_{k1}(K_0,K_1),f_{k1}(K_1,K_2))=f_{k1}(K_0,K_2)$ for any K,$K_1$,$K_2 \in KEY_1$.

A set of such functions $(f_{k1},g_{k1},h_{k1})$ can be, for example, $(f_{k1},g_{k1},h_{k1})=(((x_1,x_2)\to x_1-x_2),((y_1,y_2)\to y_1+y_2),((z_1,z_2)\to z_1+z_2))$ or $(f_{k1},g_{k1},h_{k1})=(((x_1,x_2)\to x_1/x_2),((y_1,y_2)\to y_1y_2),((z_1,z_2)\to z_1\cdot_2))$, which satisfy the properties of $(f_{k1},g_{k1},h_{k1})$ described above. For $x_1-x_2$, the computation "−" means a difference in an additive (+) group when a structure as an additive group is contained in the key space. For $x_1/x_2$, the computation "/" means a quotient in a multiplicative (·) group when a structure as a multiplicative group is contained in the key space. The description below is for a case where $(f_{k1},g_{k1},h_{k1})=(((x_1,x_2)\to x_1-x_2),((y_1,y_2)\to y_1+y_2),((z_1,z_2)\to z_1+z_2))$ or $(f_{k1},g_{k1},h_{k1})=(((x_1,x_2)\to x_1/x_2),((y_1,y_2)\to y_1\cdot y_2),((z_1,z_2)\to z_1\cdot z_2))$.

First Embodiment

A communication system in a first embodiment as a variation which uses public key encryption is described below.

As shown in FIG. 1, a communication system 1 in this embodiment includes a communication terminal 11 having transmission capability, a communication terminal 12 having reception capability, a communication terminal 13 having key updating capability, and a server device 14. These devices are interconnected over a network 9 so that they can communicate with each other. There may be multiple ones of the communication terminal 11, the communication terminal 12, the communication terminal 13, and the server device 14, respectively. For the sake of illustration, the following description assumes that there are single ones of these devices, respectively.

Figure 2:
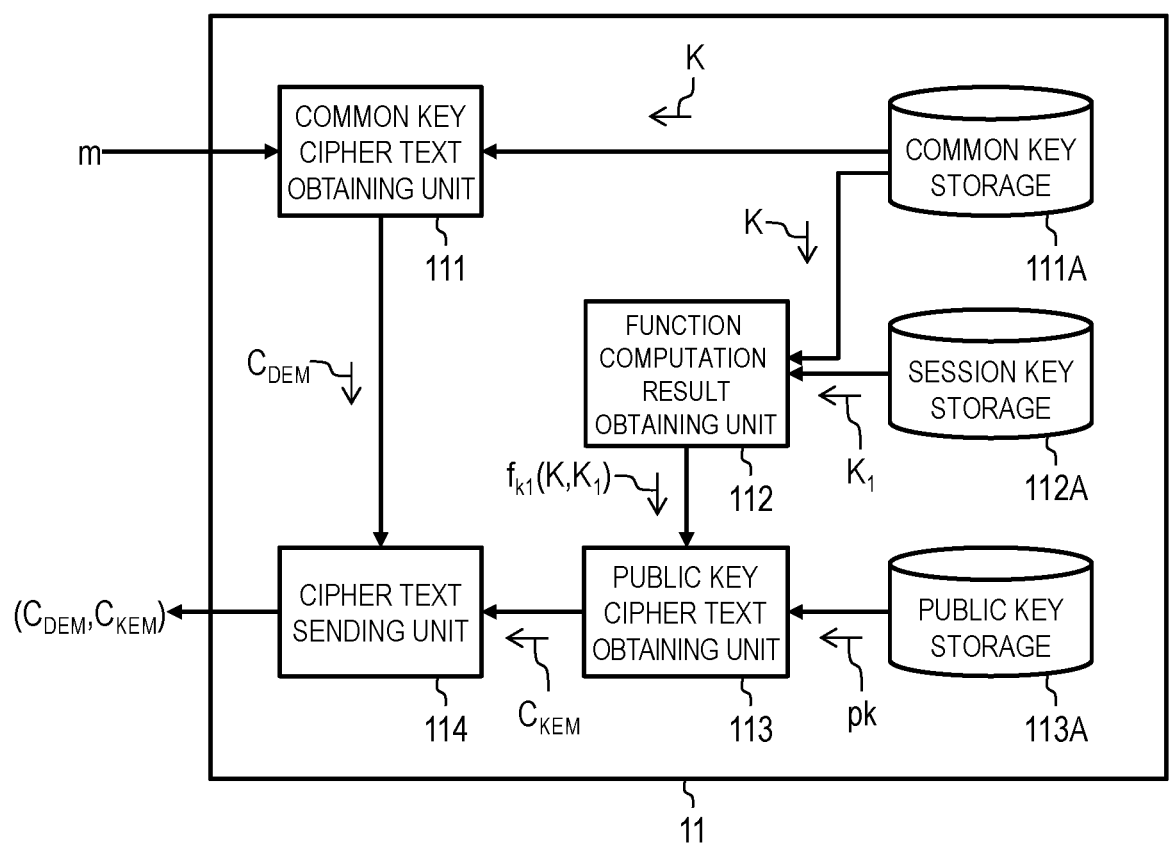
FIG. 2 is a block diagram showing a configuration of a communication terminal having transmission capability in the first embodiment.

As shown in FIG. 2, the communication terminal 11 includes a common key cipher text obtaining unit 111, a common key storage 111A, a function computation result obtaining unit 112, a session key storage 112A, a public key cipher text obtaining unit 113, a public key storage 113A, and a cipher text sending unit 114. The common key storage 111A prestores the common key K, the session key storage 112A prestores the session key $K_1$, which is shared with other communication terminals, and the public key storage 113A prestores the public key pk.

Figure 7:
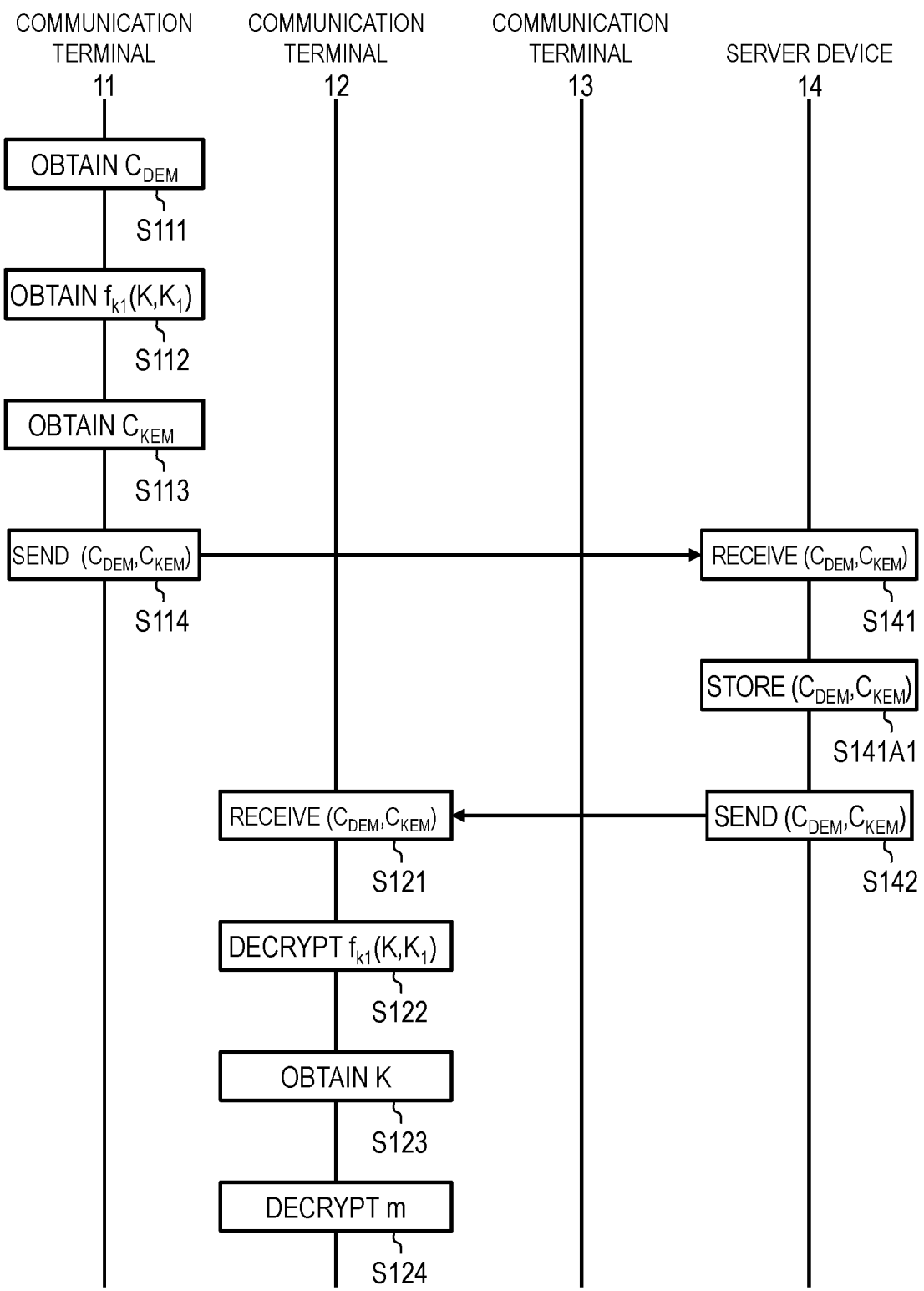
FIG. 7 is a sequence chart illustrating transmitting and receiving operations of the communication system in the first embodiment.

As shown in FIG. 7, the common key cipher text obtaining unit 111 encrypts a message m based on the common key K (DEM.Enc(K,m)) to obtain the common key cipher text $C_{DEM}$ (S111). The function computation result obtaining unit 112 computes the common key K and the session key $K_1$ based on the function $f_{k1}$ to obtain a function computation result $f_{k1}(K,K_1)$ (S112). The public key cipher text obtaining unit 113 encrypts the function computation result $f_{k1}(K,K_1)$ based on the public key pk (KEM.Enc(pk,$f_{k1}(K,K_1)$)) to obtain the public key cipher text $C_{KEM}$(S113). The cipher text sending unit 114 sends the common key cipher text $C_{DEM}$ and the public key cipher text $C_{KEM}$ to the server device 14 (S114).

Figure 3:
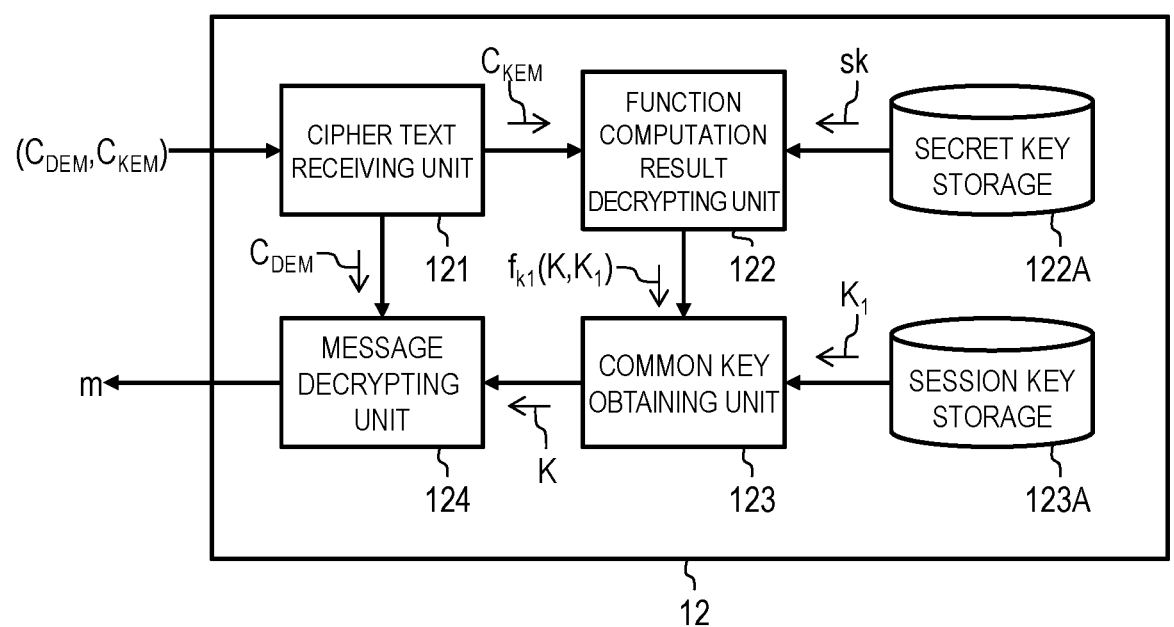
FIG. 3 is a block diagram showing a configuration of a communication terminal having reception capability in the first embodiment.

As shown in FIG. 3, the communication terminal 12 includes a cipher text receiving unit 121, a function computation result decrypting unit 122, a secret key storage 122A, a common key obtaining unit 123, a session key storage 123A, and a message decrypting unit 124. The secret key storage 122A prestores the secret key sk, and the session key storage 123A prestores the session key $K_1$, which is shared with other communication terminals.

As shown in FIG. 7, the cipher text receiving unit 121 receives the common key cipher text $C_{DEM}$ and the public key cipher text $C_{KEM}$ from the server device 14 (S121). The function computation result decrypting unit 122 decrypts the received public key cipher text $C_{KEM}$ based on the secret key sk (KEM.Dec(sk,$C_{KEM}$)) to obtain the function computation result $f_{k1}(K,K_1)$ (S122). The common key obtaining unit 123 computes the session key $K_1$ and the function computation result $f_{k1}(K,K_1)$ based on the function $h_{k1}$ ($h_{k1}$ ($f_{k1}(K,K_1)$, $K_1$)) to obtain the common key K (S123). The message decrypting unit 124 decrypts the received common key cipher text $C_{DEM}$ based on the obtained common key K (DEM.Dec(K,$C_{DEM}$)) to obtain the message m (S124).

Figure 4:
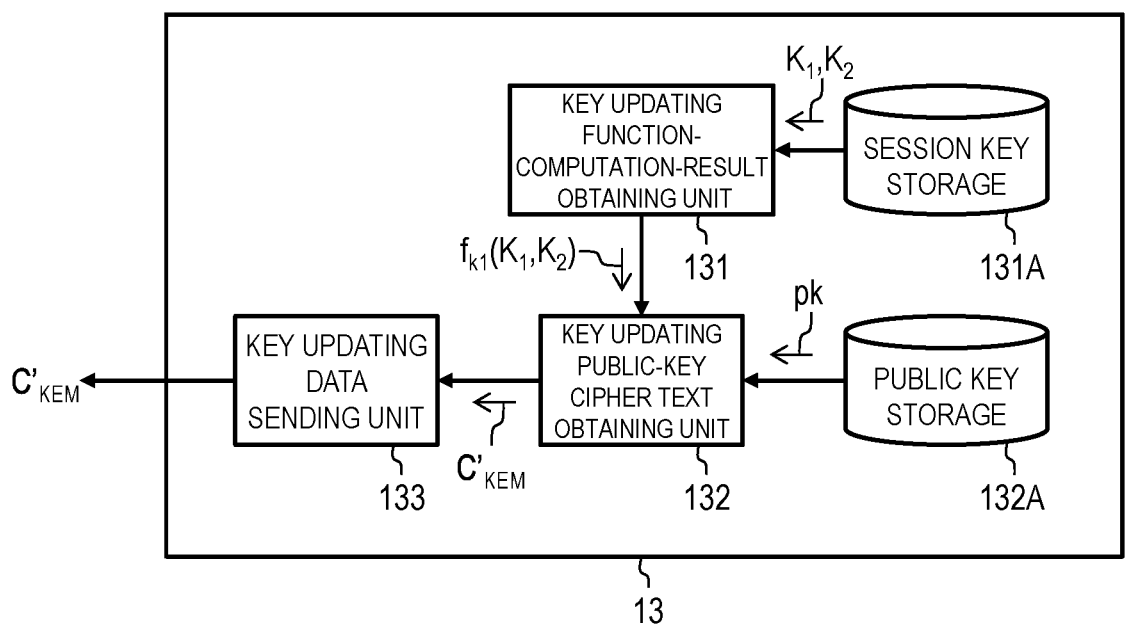
FIG. 4 is a block diagram showing a configuration of a communication terminal having key updating capability in the first embodiment.

As shown in FIG. 4, the communication terminal 13 includes a key updating function-computation-result obtaining unit 131, a session key storage 131A, a key updating public-key cipher text obtaining unit 132, a public key storage 132A, and a key updating data sending unit 133. The session key storage 131A prestores the session key $K_1$, which is shared with other communication terminals (and also stores the updated session key $K_2$ and the like), and the public key storage 132A prestores the public key pk.

Figure 8:
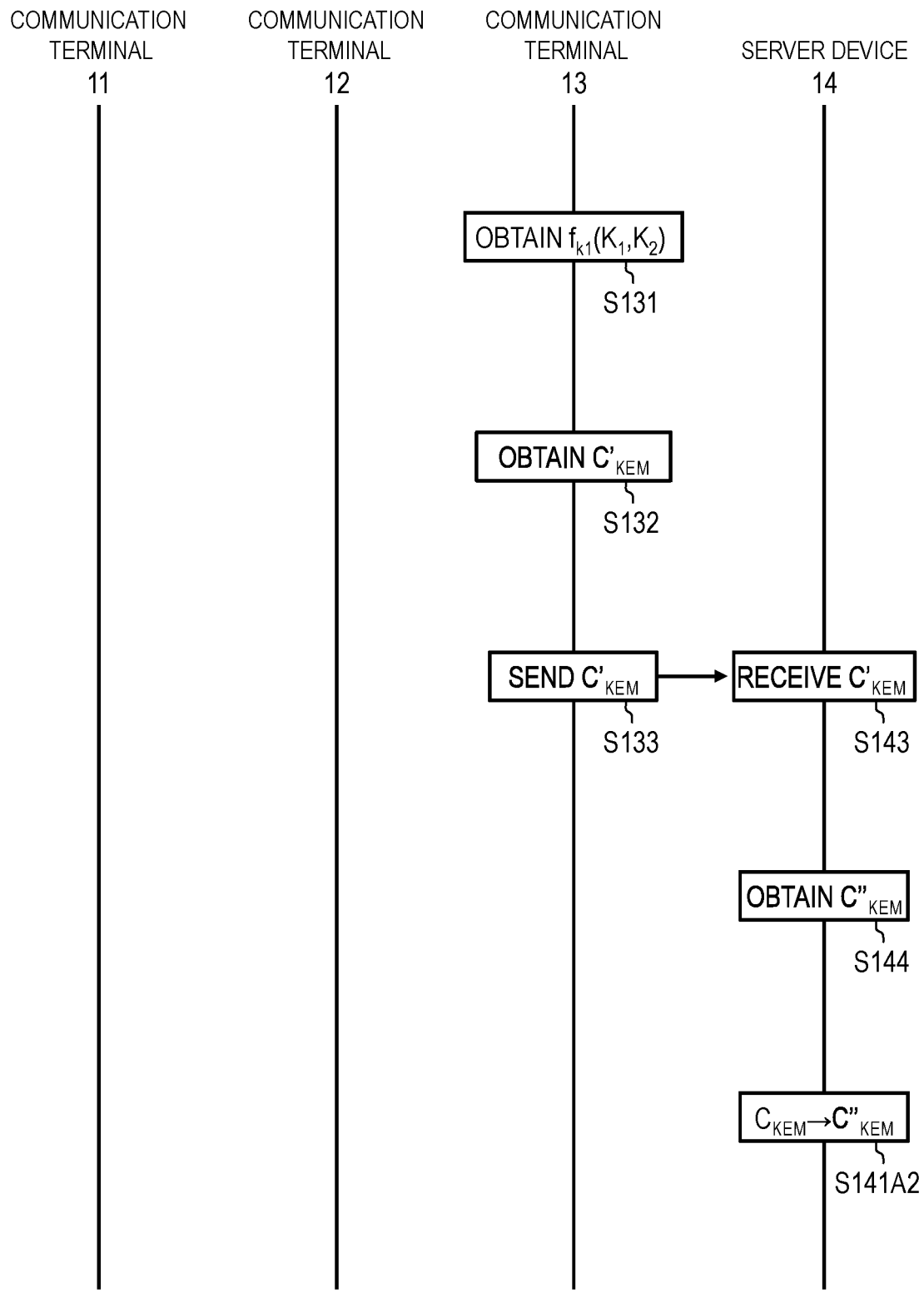
FIG. 8 is a sequence chart illustrating key updating operations of the communication system in the first embodiment.

As shown in FIG. 8, the key updating function-computation-result obtaining unit 131 computes the session key $K_1$ and the already updated session key $K_2$ (hereinafter also referred to as updated session key $K_2$) based on the function $f_{k1}$ to obtain a key updating function-computation result $f_{k1}(K_1,K_2)$ (S131). The key updating public-key cipher text obtaining unit 132 encrypts the key updating function-computation result $f_{k1}(K_1,K_2)$ based on the public key pk (KEM.Enc(pk,$f_{k1}(K_1,K_2)$)) to obtain key updating public-key cipher text $C'_{KEM}$ (S132). The key updating data sending unit 133 sends the key updating public-key cipher text $C'_{KEM}$ to the server device 14 (S133).

Figure 5:
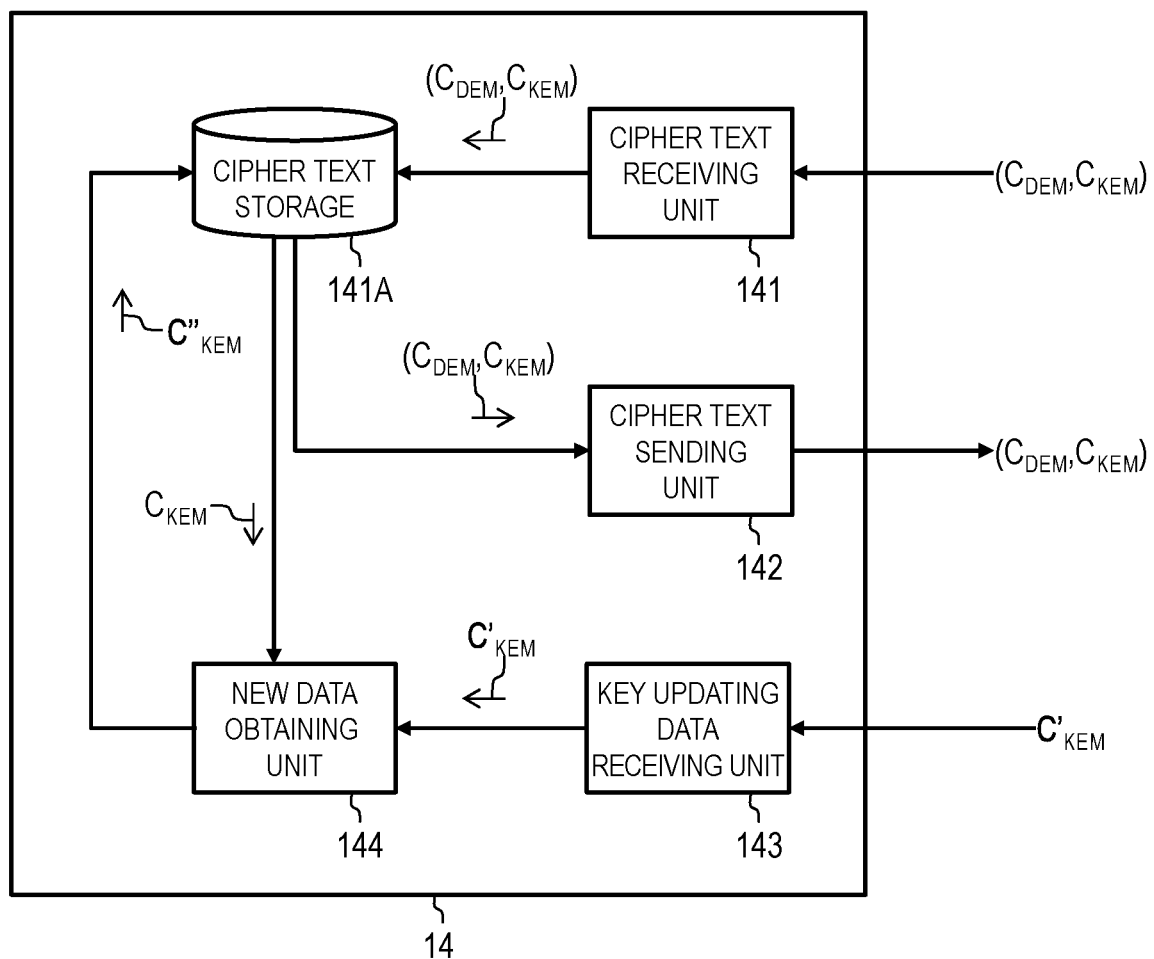
FIG. 5 is a block diagram showing a configuration of a server device in the first embodiment.

As shown in FIG. 5, the server device 14 includes a cipher text receiving unit 141, a cipher text storage 141A, a cipher text sending unit 142, a key updating data receiving unit 143, and a new data obtaining unit 144.

As shown in FIG. 7, the cipher text receiving unit 141 receives the common key cipher text $C_{DEM}$ and the public key cipher text $C_{KEM}$ from the communication terminal 11 (S141). The cipher text storage 141A stores the received common key cipher text $C_{DEM}$ and public key cipher text $C_{KEM}$(S141A1). The cipher text sending unit 142 sends the common key cipher text $C_{DEM}$ and the public key cipher text $C_{KEM}$ to the communication terminal 12 (S142).

As shown in FIG. 8, the key updating data receiving unit 143 receives the key updating public-key cipher text $C'_{KEM}$ from the communication terminal 13 (S143). The new data obtaining unit 144 computes the public key cipher text $C_{KEM}$ and the key updating public-key cipher text $C'_{KEM}$ based on the function $g_{k1}$ ($g_{k1}(C_{KEM},C'_{KEM})$) to obtain new public key cipher text $C''_{KEM}$ (S144).

By decrypting the new public key cipher text $C''_{KEM}$ based on the secret key sk (KEM.Dec(sk,$C''_{KEM}$)) at step S122, the function computation result $f_{k1}(K,K_2)$ can be obtained. Further, the common key K can be obtained at step S123 by computing the updated session key $K_2$ and the function computation result $f_{k1}(K,K_2)$ based on the function $h_{k1}(h_{k1}(f_{k1}(K,K_2),K_2))$. It has thus been confirmed that it is possible to decrypt the message m using the updated session key $K_2$. It has been also confirmed that the session key can be updated while being kept concealed from the server device 14 because it is difficult to know the updated session key $K_2$ even via $C'_{KEM}$ or $C''_{KEM}$, which are handled in the server device 14.

Figure 6:
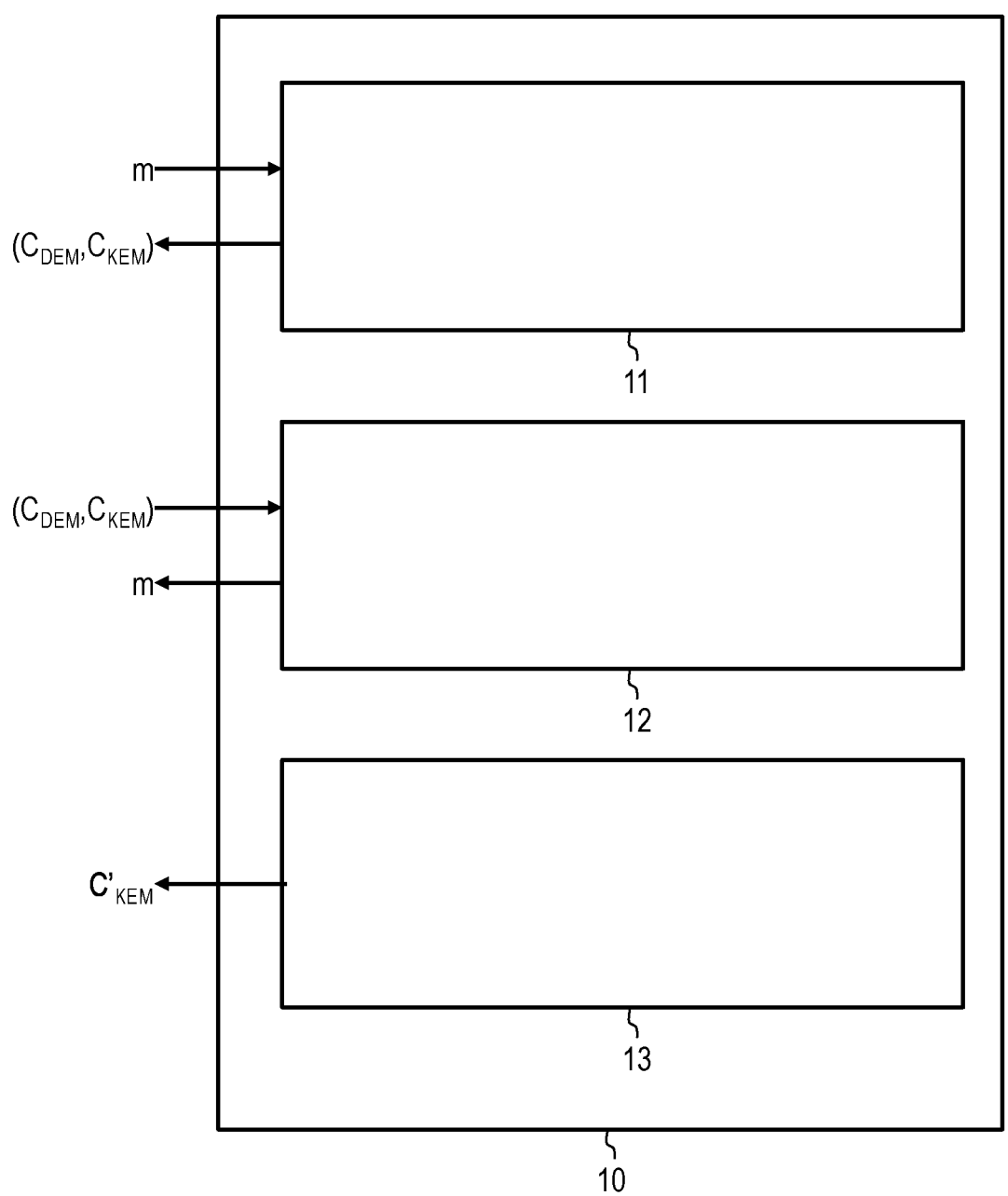
FIG. 6 is a block diagram showing a configuration of a communication terminal having all of the transmission capability, reception capability, and key updating capability in the first embodiment.

The first embodiment discussed above showed the communication terminal 11 having transmission capability, the communication terminal 12 having reception capability, and the communication terminal 13 having key updating capability as an example. The communication terminal of the present invention is not limited to the above example, however. For example, it may be implemented as a communication terminal having any two of the transmission capability, reception capability, and key updating capability, for example. It may also be implemented as a communication terminal 10 having all of the transmission capability, reception capability, and key updating capability, as shown in FIG. 6.

Exemplary Implementation a of the First Embodiment

The exemplary implementation A below describes an example where the RSA encryption scheme is used as the public key encryption scheme. The communication terminal 11, the communication terminal 12, and the communication terminal 13 perform communication with the server device 14. The communication terminal 11, the communication terminal 12, and the communication terminal 13 can be personal computers, smartphones or the like, although they are not limited to a specific type of device. The communication system in this exemplary implementation permits formation of a group of users who exchange messages with each other. Such a group will be referred to herein as a message room.

An identifier of a message room to which a user belongs is referred to as roomID.

A public key and a secret key associated with the public key encryption scheme (KEM.Enc,KEM.Dec) for the room (roomID) to which the user belongs are referred to as $pk_{roomID}$ and $sk_{roomID}$, respectively.

<Encryption and Message Transmission>

The user of the communication terminal 11 is called user A and the user of the communication terminal 12 is called user B. It is assumed that the communication terminal 11 and the communication terminal 12 have already obtained the session key $K_1$ and hold it in the session key storage 112A and the session key storage 123A, respectively. This session key $K_1$ is not known by the server device 14. The user A sends a message $m_1$ to the user B.

The communication terminal 11 has previously generated a random number K as the common key for message encryption and stored it in the common key storage 111A in advance. The symmetric key encryption scheme used in message encryption is assumed to be (DEM.Enc,DEM.Dec).

The communication terminal 11 retrieves the common key K from the common key storage 111A, the session key $K_1$ from the session key storage 112A, and the public key $pk_{roomID}$ from the public key storage 113A, and calculates $(C_{DEM},C_{RSA})=(DEM.Enc(K,m_1),RSA.Enc(pk_{roomID},K/K_1))$. For $K/K_1$ which is input to the RSA.Enc function, the computation "/" is represented as $K/K_1=K \cdot K_1^{-1}$, where "." represents multiplication with a residue ring which is modulo the product $n=pq$ of two prime numbers p, q that were generated during the setup for the RSA encryption scheme, and where $K_1^{-1}$ is the inverse element of $K_1$ in this computation. The communication terminal 11 sends $(C_{DEM}, C_{RSA})$ to the server device 14.

<Message Reception and Decryption>

The server device 14 saves $(C_{DEM},C_{RSA})$ received from the communication terminal 11 in the cipher text storage 141A. Note that $(C_{DEM},C_{RSA})$ needs to be saved for each message sent from the communication terminal 11. The server device 14 sends $(C_{DEM},C_{RSA})$ to the communication terminal 12. The communication terminal 12 receives $(C_{DEM},C_{RSA})$ from the server device 14.

The communication terminal 12 retrieves the secret key $sk_{roomID}$ from the secret key storage 122A and calculates Temp=RSA.Dec($sk_{roomID}$, $C_{RSA}$). The communication terminal 12 retrieves the session key $K_1$ from the session key storage 123A and obtains the common key $K=Temp \cdot K_1$. Using this common key K, the communication terminal 12 decrypts the message $m_1$($m_1$=DEM.Dec($K_1,C_{DEM}$)).

<Update of Session Key>

It is assumed that the communication terminal 13 updates the session key from $K_1$ to $K_2$. The server device 14 has previously obtained $(C_{DEM}, C_{RSA})=(DEM.Enc(K,m_1), RSA.Enc(pk_{roomID},K/K_1))$ from the communication terminal 11. Here, $m_1$ is a message that was sent by the communication terminal 11 in the message room indicated by roomID before the key was updated, and K is the common key that was generated when that message was sent. The communication terminal 13 retrieves the old session key $K_1$ and the new session key $K_2$ from the session key storage 131A and the public key $pk_{roomID}$ from the public key storage 132A, and calculates $C'_{RSA}$=RSA.Enc($pk_{roomID},K_1/K_2$). The communication terminal 13 sends $C'_{RSA}$ to the server device 14. The server device 14 receives $C'_{RSA}$ from the communication terminal 13, and further performs processing for retrieving $C_{RSA}$ from the cipher text storage 141A, calculating $C''_{RSA}=C_{RSA} \cdot C'_{RSA}=$RSA.Enc($pk_{roomID}$, $K/K_2$), overwriting the $C_{RSA}$ already saved in the cipher text storage 141A with $C''_{RSA}$, and saving it.

Exemplary Implementation B of the First Embodiment

The exemplary implementation B below describes an example where the elliptic curve ElGamal encryption scheme is used as the public key encryption scheme.

<Encryption and Message Transmission>

The communication terminal 11 uses the common key K, the session key $K_1$, and the public key $pk_{roomID}$ to calculate $(C_{DEM}, C_{ECEG})=($DEM.Enc$(K,m_1),$ECEG.Enc$(pk_{roomID},K-K_1))$ in a similar manner to the foregoing example. For $K-K_1$ which is input to the ECEG.Enc function, the computation "−" means a difference in the additive (+) group formed by points on the elliptic curve that was generated during the setup for the elliptic curve ElGamal encryption scheme. The communication terminal 11 sends $(C_{DEM}, C_{ECEG})$ to the server device 14.

<Message Reception and Decryption>

The server device 14 receives $(C_{DEM}, C_{ECEG})$ from the communication terminal 11 and saves it in the cipher text storage 141A. Note that $(C_{DEM}, C_{ECEG})$ needs to be saved for each message sent from the communication terminal 11. The server device 14 sends $(C_{DEM}, C_{ECEG})$ to the communication terminal 12. The communication terminal 12 receives $(C_{DEM}, C_{ECEG})$ from the server device 14. The communication terminal 12 retrieves the secret key $sk_{roomID}$ from the secret key storage 122A and calculates Temp=ECEG.Dec$(sk_{roomID}, C_{ECEG})$. The communication terminal 12 retrieves the session key $K_1$ from the session key storage 123A and obtains the common key $K=$Temp$+K_1$. Using this common key K, the message $m_1$ is decrypted ($m_1=$DEM.Dec$(K,C_{DEM})$).

<Update of Session Key>

It is assumed that the communication terminal 13 updates the session key from $K_1$ to $K_2$. The server device 14 has previously obtained $(C_{DEM}, C_{ECEG})=($DEM.Enc$(K,m_1),$ECEG.Enc$(pk_{roomID},K-K_1))$ from the communication terminal 11. Here, $m_1$ is a message that was sent by the communication terminal 11 in the message room indicated by roomID before the key was updated, and K is the common key that was generated when that message was sent. The communication terminal 13 retrieves the old session key $K_1$ and the new session key $K_2$ from the session key storage 131A and the public key $pk_{roomID}$ from the public key storage 132A, and calculates $C'_{ECEG}=$ECEG.Enc $(pk_{roomID},K_1-K_2)$. The communication terminal 13 sends $C'_{ECEG}$ to the server device 14. The server device 14 receives $C'_{ECEG}$ from the communication terminal 13, and further performs processing for retrieving $C_{ECEG}$ from the cipher text storage 141A, calculating $C''_{ECEG}=C_{ECEG}+C_{ECEG}=$ECEG.Enc$(pk_{roomID},K-K_2)$, overwriting the $C_{ECEG}$ already saved in the cipher text storage 141A with $C''_{ECEG}$, and saving it.

Second Embodiment

A communication system in a second embodiment as a variation which does not use public key encryption is described below.

Figure 9:
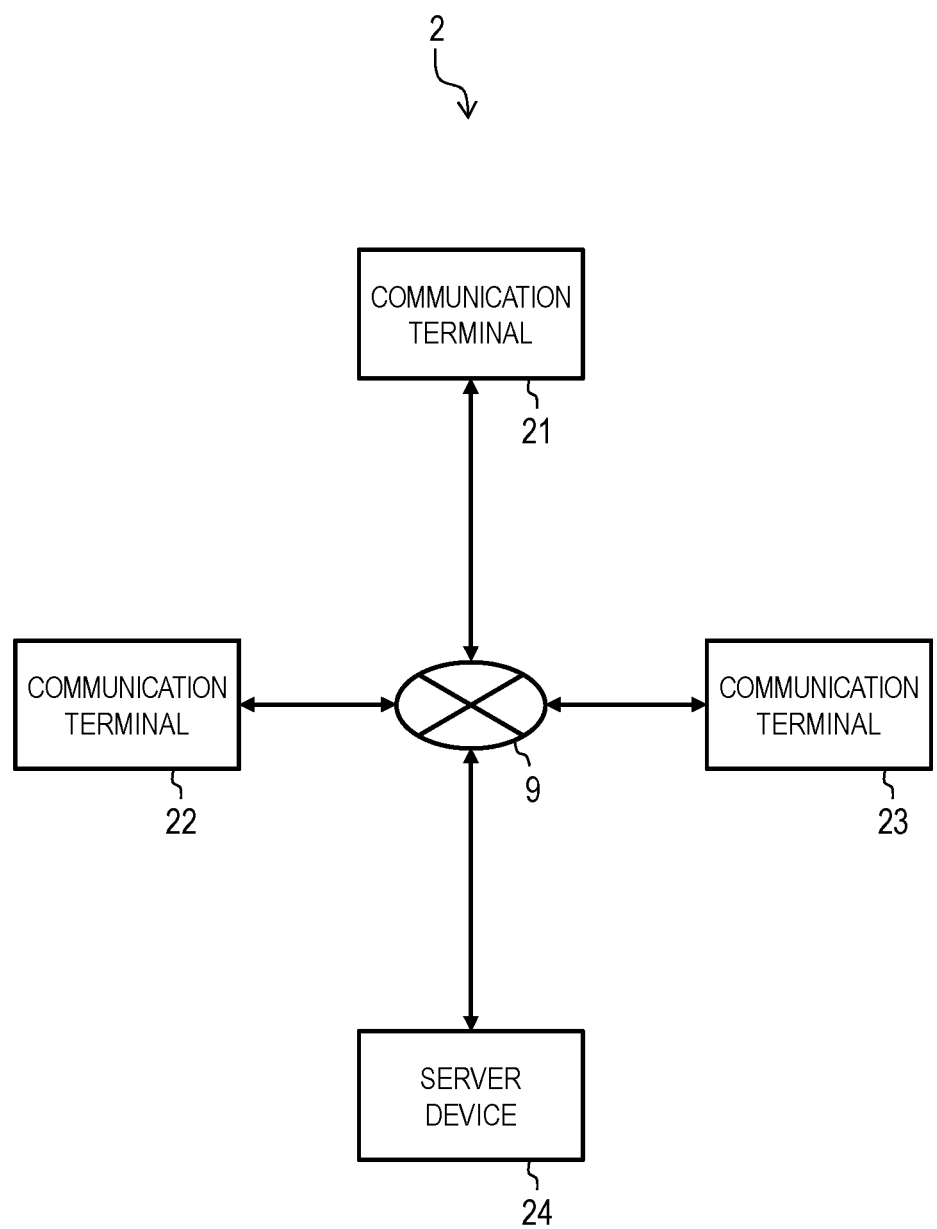
FIG. 9 is a block diagram showing a configuration of a communication system in a second embodiment.

As shown in FIG. 9, a communication system 2 in this embodiment includes a communication terminal 21 having transmission capability, a communication terminal 22 having reception capability, a communication terminal 23 having key updating capability, and a server device 24. These devices are interconnected over the network 9 so that they can communicate with each other. There may be multiple ones of the communication terminal 21, the communication terminal 22, the communication terminal 23, and the server device 24, respectively. For the sake of illustration, the following description assumes that there are single ones of these devices, respectively.

Figure 10:
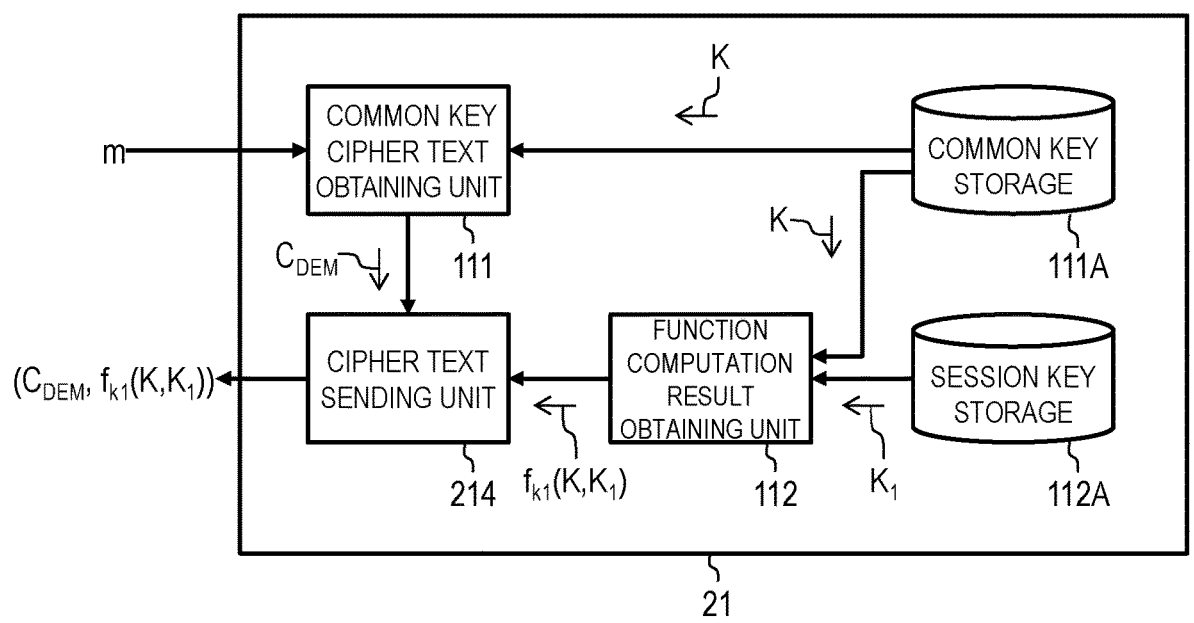
FIG. 10 is a block diagram showing a configuration of a communication terminal having transmission capability in the second embodiment.

As shown in FIG. 10, the communication terminal 21 includes a common key cipher text obtaining unit 111, a common key storage 111A, a function computation result obtaining unit 112, a session key storage 112A, and a cipher text sending unit 214, and is similar to the first embodiment for the components except the cipher text sending unit 214. Since this embodiment does not use public key encryption, it does not require the public key cipher text obtaining unit 113 and the public key storage 113A present in the first embodiment.

Figure 15:
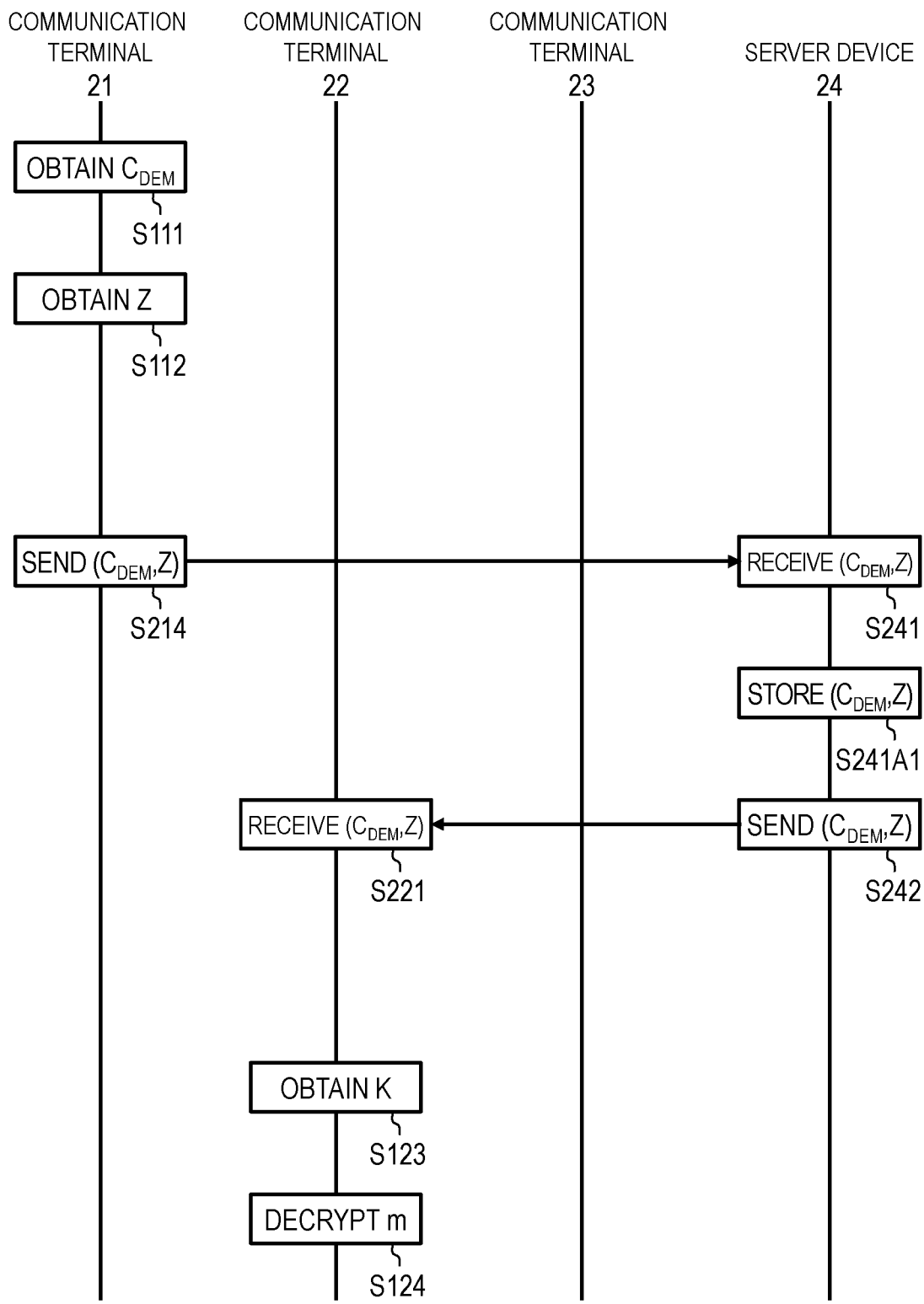
FIG. 15 is a sequence chart illustrating transmitting and receiving operations of the communication system in the second embodiment.

As shown in FIG. 15, the common key cipher text obtaining unit 111 encrypts the message m based on the common key K (DEM.Enc(K,m)) to obtain the common key cipher text $C_{DEM}$ (S111). The function computation result obtaining unit 112 computes the common key K and the session key $K_1$ based on the function $f_{k1}$ to obtain the function computation result $f_{k1}(K,K_1)$ (S112). The function computation result is also denoted as Z hereinbelow. The cipher text sending unit 214 sends the common key cipher text $C_{DEM}$ and the function computation result Z to the server device 14 (S214).

Figure 11:
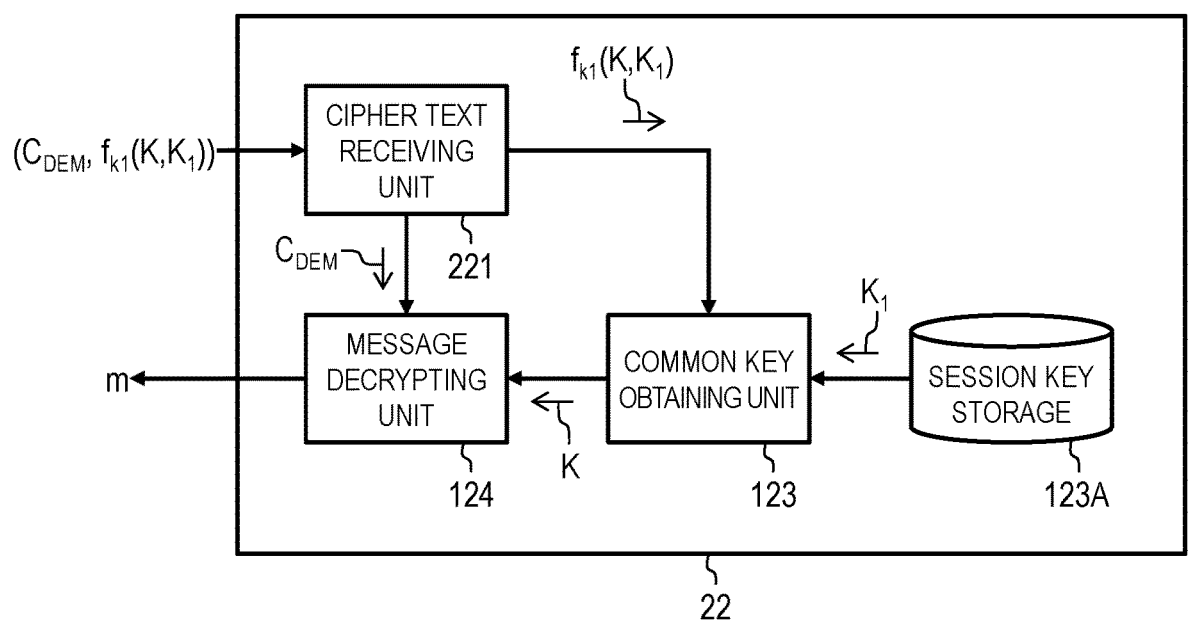
FIG. 11 is a block diagram showing a configuration of a communication terminal having reception capability in the second embodiment.

As shown in FIG. 11, the communication terminal 22 includes a cipher text receiving unit 221, a common key obtaining unit 123, a session key storage 123A, and a message decrypting unit 124, and is similar to the first embodiment for the components except the cipher text receiving unit 221. Since this embodiment does not use public key encryption, it does not require the function computation result decrypting unit 122 and the secret key storage 122A present in the first embodiment.

As shown in FIG. 15, the cipher text receiving unit 221 receives the common key cipher text $C_{DEM}$ and the function computation result Z from the server device 14 (S221). The common key obtaining unit 123 computes the session key $K_1$ and the function computation result $f_{k1}(K,K_1)$ based on the function $h_{k1}$ ($h_{k1}(f_{k1}(K,K_1),K_1)$) to obtain the common key K (S123). The message decrypting unit 124 decrypts the received common key cipher text $C_{DEM}$ based on the obtained common key K (DEM.Dec$(K,C_{DEM})$) to obtain the message m (S124).

Figure 12:
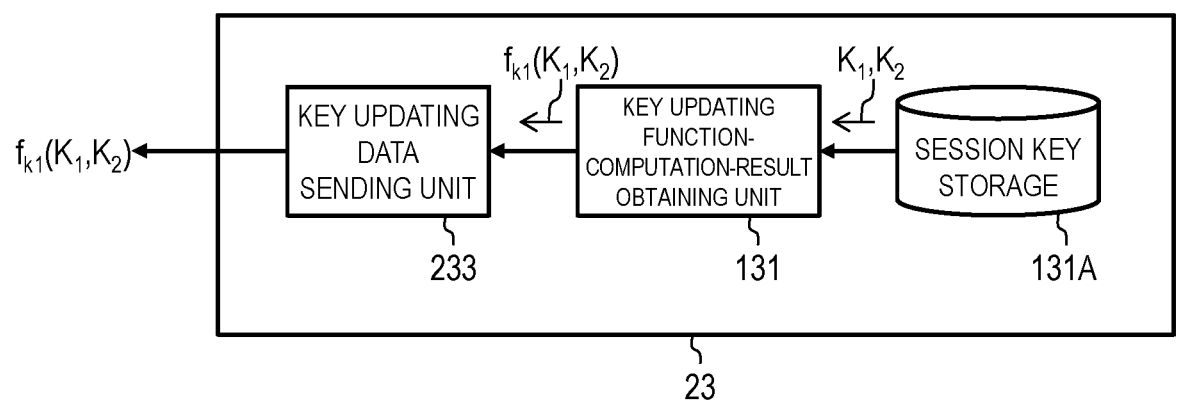
FIG. 12 is a block diagram showing a configuration of a communication terminal having key updating capability in the second embodiment.

As shown in FIG. 12, the communication terminal 23 includes a key updating function-computation-result obtaining unit 131, a session key storage 131A, and a key updating data sending unit 233, and is similar to the first embodiment for the components except the key updating data sending unit 233. Since this embodiment does not use public key encryption, it does not require the key updating public-key cipher text obtaining unit 132 and the public key storage 132A present in the first embodiment.

Figure 16:
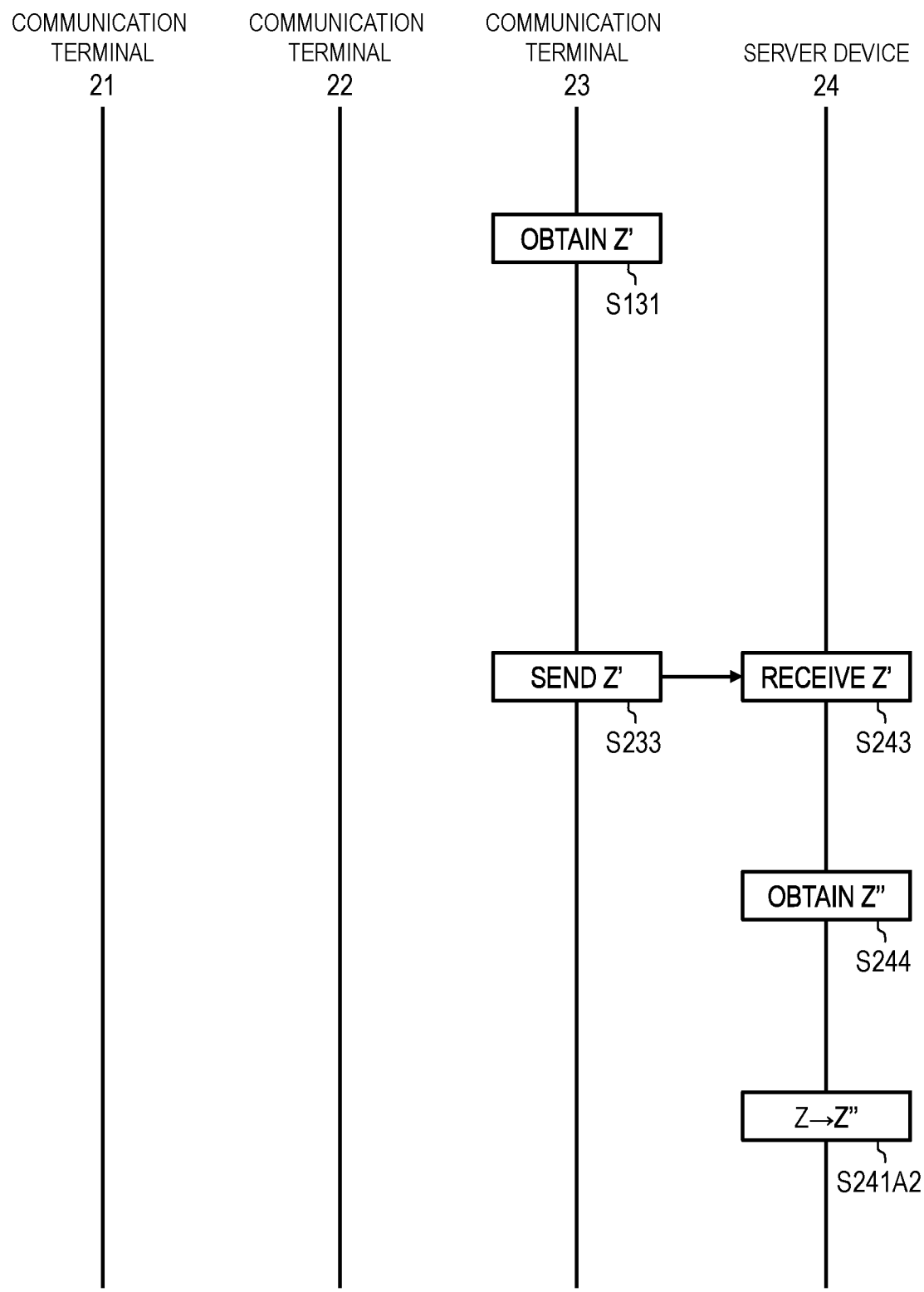
FIG. 16 is a sequence chart illustrating key updating operations of the communication system in the second embodiment.

As shown in FIG. 16, the key updating function-computation-result obtaining unit 131 computes the session key $K_1$ and an already updated session key $K_2$ (hereinafter also referred to as updated session key $K_2$) based on the function $f_{k1}$ to obtain the key updating function-computation result $f_{k1}(K_1,K_2)$ (S131). The key updating function-computation result is also denoted as Z' hereinbelow. The key updating data sending unit 233 sends the key updating function-computation result Z' to the server device 24 (S233).

Figure 13:
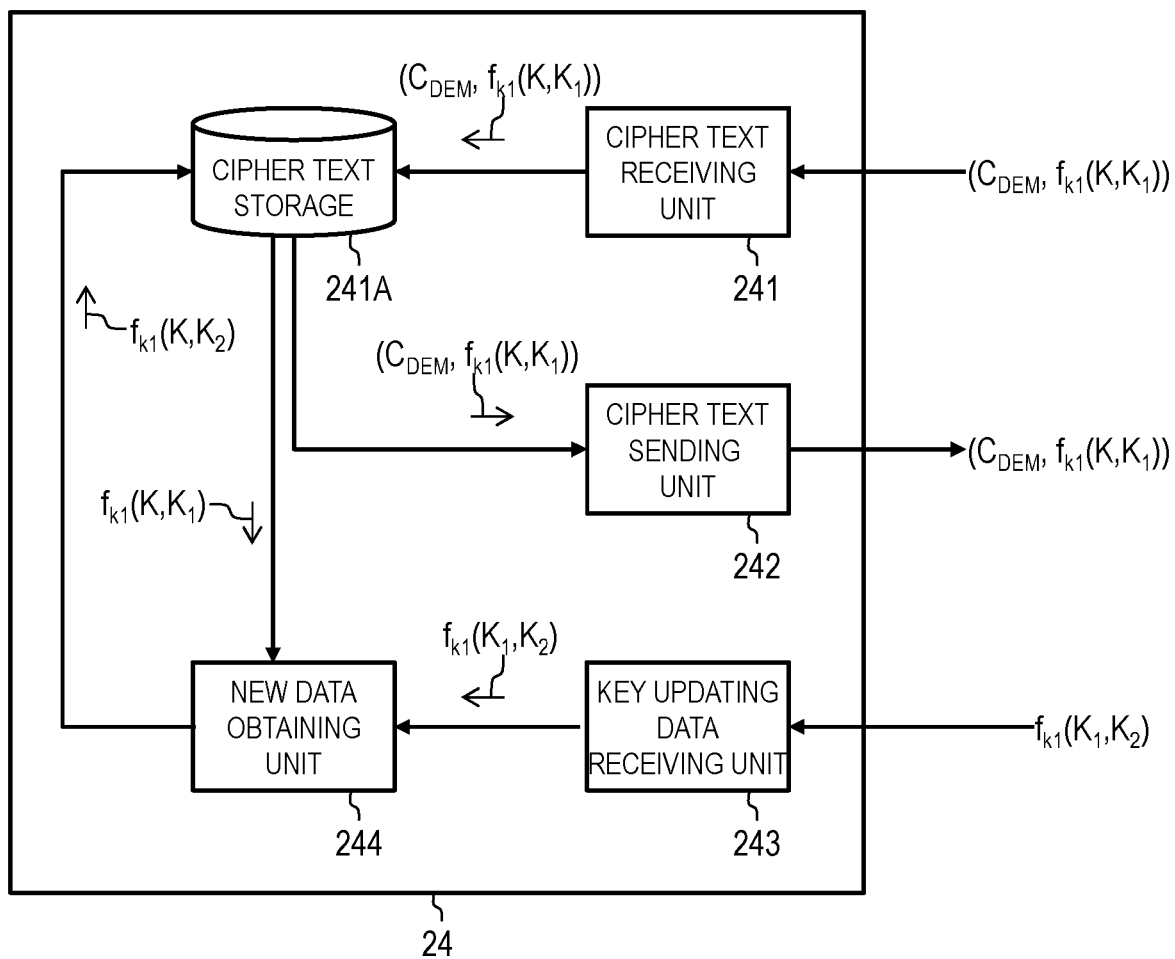
FIG. 13 is a block diagram showing a configuration of a server device in the second embodiment.

As shown in FIG. 13, the server device 24 includes a cipher text receiving unit 241, a cipher text storage 241A, a cipher text sending unit 242, a key updating data receiving unit 243, and a new data obtaining unit 244.

As shown in FIG. 15, the cipher text receiving unit 241 receives the common key cipher text $C_{DEM}$ and the function computation result Z from the communication terminal 21 (S241). The cipher text storage 241A stores the received common key cipher text $C_{DEM}$ and function computation result Z (S241A1). The cipher text sending unit 242 sends the common key cipher text $C_{DEM}$ and the function computation result Z to the communication terminal 22 (S242).

As shown in FIG. 16, the key updating data receiving unit 243 receives the key updating function-computation result Z' from the communication terminal 23 (S243). The new data obtaining unit 244 computes the function computation result Z and the key updating function-computation result Z' based on the function $g_{k1}$ ($g_{k1}(Z,Z')$) to obtain a new function computation result Z'' (S244).

At step S123, the common key K can be obtained by computing the updated session key $K_2$ and the function computation result $f_{k1}(K,K_2)$ based on the function $h_{k1}$ ($h_{k1}(f_{k1}(K,K_2),K_2)$). It has thus been confirmed that it is possible to decrypt the message m using the updated session key $K_2$. It has been also confirmed that the session key can be updated while being kept concealed from the server device 24 because it is difficult to know the updated session key $K_2$ even via Z' or Z'', which are handled in the server device 24.

Figure 14:
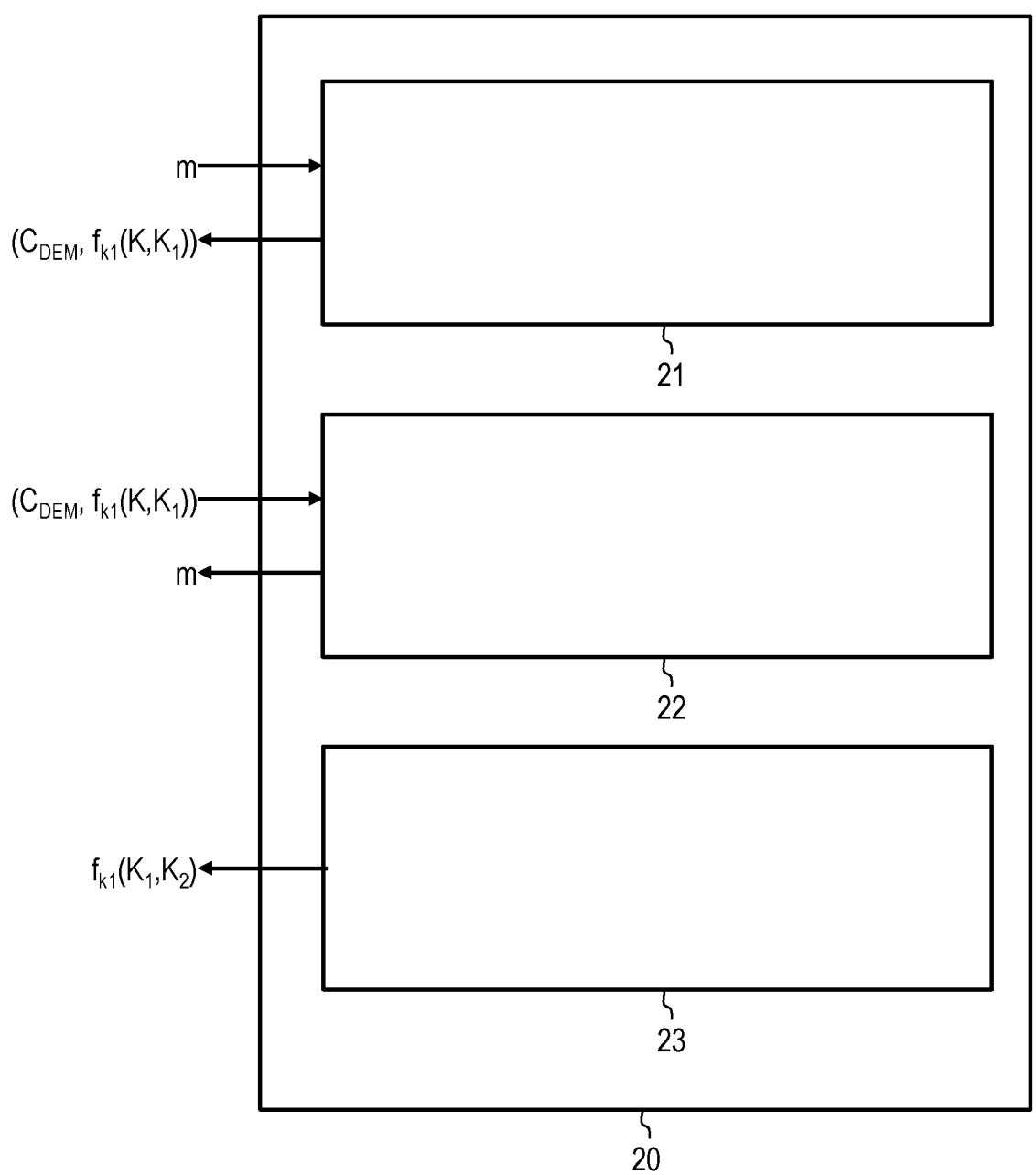
FIG. 14 is a block diagram showing a configuration of a communication terminal having all of the transmission capability, reception capability, and key updating capability in the second embodiment.

The second embodiment discussed above showed the communication terminal 21 having transmission capability, the communication terminal 22 having reception capability, and the communication terminal 23 having key updating capability as an example. The communication terminal of the present invention is not limited to the above example, however. For example, it may be implemented as a communication terminal having any two of the transmission capability, reception capability, and key updating capability, for example. It may also be implemented as a communication terminal 20 having all of the transmission capability, reception capability, and key updating capability, as shown in FIG. 14.

Exemplary Implementation of the Second Embodiment

An exemplary implementation of the second embodiment is shown below.

<Encryption and Message Transmission>

The communication terminal 21 calculates ($C_{DEM}$,Key)= (DEM.Enc(K,$m_1$),K/$K_1$) (or ($C_{DEM}$,Key)=(DEM.Enc(K,$m_1$),K−$K_1$)). The communication terminal 21 sends ($C_{DEM}$, Key) to the server device 24.

<Message Reception and Decryption>

The server device 24 receives ($C_{DEM}$,Key) from the communication terminal 21 and saves it in the cipher text storage 241A. Note that ($C_{DEM}$,Key) needs to be saved for each message sent from the communication terminal 21. The server device 24 sends ($C_{DEM}$,Key) to the communication terminal 22. The communication terminal 22 receives ($C_{DEM}$,Key) from the server device 24. From this, the communication terminal 22 obtains K=Temp·$K_1$ (or K=Temp+$K_1$). Using this common key K, the communication terminal 22 decrypts the message $m_1$ ($m_1$=DEM.Dec(K,$C_{DEM}$)).

<Update of Session Key>

It is assumed that the communication terminal 23 updates the session key from $K_1$ to $K_2$.

The server device 24 has previously obtained ($C_{DEM}$, Key)= (DEM.Enc(K,$m_1$),K/$K_1$) (or ($C_{DEM}$,Key)=(DEM.Enc(K,$m_1$),K−$K_1$)) from the communication terminal 21. Here, $m_1$ is a message that was sent by the communication terminal 21 in the message room indicated by roomID before the key was updated, and K is the common key that was generated when that message was sent. The communication terminal 23 retrieves the old session key $K_1$ and the new session key $K_2$ from the session key storage 131A, and calculates Key'=$K_1$/$K_2$ (or Key'=$K_1$−$K_2$). The communication terminal 23 sends Key' to the server device 24. The server device 24 receives Key' from the communication terminal 23, and further performs processing for retrieving Key from the cipher text storage 241A, calculating Key''=Key·Key'=K/$K_2$ (or Key''=Key+Key'=K−$K_2$), overwriting the Key already saved in the cipher text storage 241A with Key'', and saving it.

The communication system 2 according to the second embodiment above can dispense with implementation of a public key encryption algorithm while guaranteeing a similar level of security to that in the first embodiment, thus reducing implementation costs.

<Appendix>

Each device according to the present invention has, as a single hardware entity, for example, an input unit to which a keyboard or the like is connectable, an output unit to which a liquid crystal display or the like is connectable, a communication unit to which a communication device (for example, communication cable) capable of communication with the outside of the hardware entity is connectable, a central processing unit (CPU, which may include cache memory and/or registers), RAM or ROM as memories, an external storage device which is a hard disk, and a bus that connects the input unit, the output unit, the communication unit, the CPU, the RAM, the ROM, and the external storage device so that data can be exchanged between them. The hardware entity may also include, for example, a device (drive) capable of reading and writing a recording medium such as a CD-ROM as desired. A physical entity having such hardware resources may be a general-purpose computer, for example.

The external storage device of the hardware entity has stored therein programs necessary for embodying the aforementioned capabilities and data necessary in the processing of the programs (in addition to the external storage device, the programs may be prestored in ROM as a storage device exclusively for reading out, for example). Also, data or the like resulting from the processing of these programs are stored in the RAM and the external storage device as appropriate.

In the hardware entity, the programs and data necessary for processing of the programs stored in the external storage device (or ROM and the like) are read into memory as necessary to be interpreted and executed/processed as appropriate by the CPU. As a consequence, the CPU embodies predetermined capabilities (the components represented above as units, means, or the like).

The present invention is not limited to the above embodiments, but modifications may be made within the scope of the present invention. Also, the processes described in the embodiments may be executed not only in a chronological sequence in accordance with the order of their description but may be executed in parallel or separately according to the processing capability of the device executing the processing or any necessity.

As already mentioned, when the processing capabilities of the hardware entities described in the embodiments (the devices of the present invention) are to be embodied with a computer, the processing actions of the capabilities to be provided by the hardware entities are described by a program. By the program then being executed on the computer, the processing capabilities of the hardware entity are embodied on the computer.

The program describing the processing actions can be recorded on a computer-readable recording medium. The computer-readable recording medium may be any kind, such as a magnetic recording device, an optical disk, a magneto-optical recording medium, or a semiconductor memory. More specifically, a magnetic recording device may be a hard disk device, flexible disk, or magnetic tape; an optical disk may be a DVD (digital versatile disc), a DVD-RAM (random access memory), a CD-ROM (compact disc read only memory), or a CD-R (recordable)/RW (rewritable); a magneto-optical recording medium may be an MO (magneto-optical disc); and a semiconductor memory may be EEP-ROM (electronically erasable and programmable-read only memory), for example.

Also, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer then reads the program stored in the recording medium thereof and executes the processing in accordance with the read program. Also, as another form of execution of this program, the computer may read the program directly from the portable recording medium and execute the processing in accordance with the program and, furthermore, every time the program is transferred to the computer from the server computer, the computer may sequentially execute the processing in accordance with the received program. Also, a configuration may be adopted in which the transfer of a program to the computer from the server computer is not performed and the above-described processing is executed by so-called application service provider (ASP)-type service by which the processing capabilities are implemented only by an instruction for execution thereof and result acquisition. Note that a program in this form shall encompass information that is used in processing by an electronic computer and acts like a program (such as data that is not a direct command to a computer but has properties prescribing computer processing).

Further, although the hardware entity was described as being configured via execution of a predetermined program on a computer in this form, at least some of these processing actions may instead be embodied with hardware.

What is claimed is:

1. A communication terminal that shares a session key with another communication terminal and receives common key cipher text and public key cipher text obtained by the other communication terminal via a server device, the other communication terminal being configured to: encrypt a message based on a common key to obtain the common key cipher text; compute the common key and the session key based on a predetermined first function to obtain a function computation result; encrypt the function computation result based on a public key to obtain the public key cipher text; and send the common key cipher text and the public key cipher text to the server device, the communication terminal comprising:

a cipher text receiving unit that receives the common key cipher text and the public key cipher text from the server device;

a function computation result decrypting unit that decrypts the received public key cipher text based on a secret key to obtain the function computation result;

a common key obtaining unit that computes the session key and the function computation result based on a predetermined second function to obtain the common key; and a message decrypting unit that decrypts the received common key cipher text based on the obtained common key to obtain the message.

2. A communication terminal that updates a session key shared among a plurality of communication terminals, one communication terminal of the plurality of communication terminals being configured to: encrypt a message based on a common key to obtain common key cipher text; compute the common key and the session key based on a predetermined first function to obtain a function computation result; encrypt the function computation result based on a public key to obtain public key cipher text; and send the common key cipher text and the public key cipher text to a server device, and one communication terminal of the plurality of communication terminals being configured to: receive the common key cipher text and the public key cipher text from the server device; decrypt the received public key cipher text based on a secret key to obtain the function computation result; compute the session key and the function computation result based on a predetermined second function to obtain the common key; and decrypt the received common key cipher text based on the obtained common key to obtain the message, the communication terminal that updates the session key comprising:

a key updating function-computation-result obtaining unit that computes the session key and an updated session key based on the first function to obtain a key updating function-computation-result;

a key updating public-key cipher text obtaining unit that encrypts the key updating function-computation result based on a public key to obtain key updating public-key cipher text; and a key updating data sending unit that sends the key updating public-key cipher text to the server device.

3. A server device that updates a session key shared among a plurality of communication terminals, one communication terminal of the plurality of communication terminals being configured to: encrypt a message based on a common key to obtain common key cipher text; compute the common key and the session key based on a predetermined first function to obtain a function computation result; encrypt the function computation result based on a public key to obtain public key cipher text; and send the common key cipher text and the public key cipher text to the server device, one communication terminal of the plurality of communication terminals being configured to: receive the common key cipher text and the public key cipher text from the server device; decrypt the received public key cipher text based on a secret key to obtain the function computation result; compute the session key and the function computation result based on a predetermined second function to obtain the common key; and decrypt the received common key cipher text based on the obtained common key to obtain the message, and one communication terminal of the plurality of communication terminals being configured to: compute the session key and an updated session key based on the first function to obtain a key updating function-computation result; encrypt the key updating function-computation result based on a public key to obtain key updating public-key cipher text; and send the key updating public-key cipher text to the server device, the server device comprising:

a new data obtaining unit that computes the public key cipher text and the key updating public-key cipher text based on a predetermined third function to obtain new public key cipher text.

4. A communication terminal that shares a session key with another communication and receives common key cipher text and a function computation result obtained by the other communication terminal via a server device, the other communication terminal being configured to: encrypt a message based on a common key to obtain the common key cipher text; compute the common key and the session key based on a predetermined first function to obtain the function computation result; and send the common key cipher text and the function computation result to the server device, the communication terminal comprising:

a cipher text receiving unit that receives the common key cipher text and the function computation result from the server device;

a common key obtaining unit that computes the session key and the function computation result based on a predetermined second function to obtain the common key; and a message decrypting unit that decrypts the received common key cipher text based on the obtained common key to obtain the message.

5. A communication terminal that updates a session key shared among a plurality of communication terminals, one communication terminal of the plurality of communication terminals being configured to: encrypt a message based on a common key to obtain common key cipher text; compute the common key and the session key based on a predetermined first function to obtain a function computation result; and send the common key cipher text and the function computation result to a server device, and one communication terminal of the plurality of communication terminals being configured to: receive the common key cipher text and the function computation result from the server device; compute the session key and the function computation result based on a predetermined second function to obtain the common key; and decrypt the received common key cipher text based on the obtained common key to obtain the message, the communication terminal that updates the session key comprising:

a key updating function-computation-result obtaining unit that computes the session key and an updated session key based on the first function to obtain a key updating function-computation result; and a key updating data sending unit that sends the key updating function-computation result to the server device.

6. A server device that updates a session key shared among a plurality of communication terminals, one communication terminal of the plurality of communication terminals being configured to: encrypt a message based on a common key to obtain common key cipher text; compute the common key and the session key based on a predetermined first function to obtain a function computation result; and send the common key cipher text and the function computation result to the server device, one communication terminal of the plurality of communication terminals being configured to: receive the common key cipher text and the function computation result from the server device; compute the session key and the function computation result based on a predetermined second function to obtain the common key; and decrypt the received common key cipher text based on the obtained common key to obtain the message, and one communication terminal of the plurality of communication terminals being configured to: compute the session key and an updated session key based on the first function to obtain a key updating function-computation result; and send the key updating function-computation result to the server device, the server device comprising:

a new data obtaining unit that computes the function computation result and the key updating function-computation result based on a predetermined third function to obtain a new function computation result.

7. A non-transitory computer readable medium including a program for causing a computer to function as the server device according to claim 3.

8. A non-transitory computer readable medium including a program for causing a computer to function as the communication terminal according to claim 1.

9. A non-transitory computer readable medium including a program for causing a computer to function as the communication terminal according to claim 2.

10. A non-transitory computer readable medium including a program for causing a computer to function as the communication terminal according to claim 4.

11. A non-transitory computer readable medium including a program for causing a computer to function as the communication terminal according to claim 5.

12. A non-transitory computer readable medium including a program for causing a computer to function as the server device according to claim 6.

* * * * *